(12) United States Patent
Bowers (10) Patent No.: US 7,568,733 B2
(45) Date of Patent: Aug. 4, 2009

(54) ARTICULATED HANDLEBAR RISER BLOCK FOR RECREATIONAL VEHICLES

(76) Inventor: Ken Bowers, Box 19, Site 215, RR 2, Stony Plain, Alberta (CA) T7Z 1X2

( * ) Notice: Subject to any disclaimer, the term of this patent is extended or adjusted under 35 U.S.C. 154(b) by 525 days.

(21) Appl. No.: 11/336,275

(22) Filed: Jan. 20, 2006

(65) Prior Publication Data

US 2006/0162483 A1 Jul. 27, 2006

(51) Int. Cl.
*B62D 1/18* (2006.01)
(52) U.S. Cl. .................. 280/775; 280/779; 280/276; 280/279
(58) Field of Classification Search ............... 280/276, 280/279, 755, 779, 775
See application file for complete search history.

(56) References Cited

U.S. PATENT DOCUMENTS

| | | | | |
|---|---|---|---|---|
| 4,688,817 | A * | 8/1987 | Marier | 280/278 |
| 4,896,559 | A * | 1/1990 | Marier et al. | 74/551.4 |
| 6,019,054 | A * | 2/2000 | Hattori et al. | 114/55.57 |
| 6,478,098 | B2 | 11/2002 | Boivin et al. | |
| 6,929,278 | B2 * | 8/2005 | Vaisanen | 280/279 |
| 7,355,090 | B2 * | 4/2008 | Ales et al. | 604/361 |
| 2002/0180166 | A1 * | 12/2002 | Voss | 280/5.5 |
| 2003/0188596 | A1 * | 10/2003 | Vaisanen | 74/484 R |
| 2003/0201129 | A2 | 10/2003 | Fecteau et al. | |
| 2004/0090031 | A1 | 5/2004 | Bergman | |
| 2005/0199432 | A1 * | 9/2005 | Abe et al. | 180/190 |

FOREIGN PATENT DOCUMENTS

CA 2 424 328 A1 10/2003

OTHER PUBLICATIONS

Polaris, "Ride Select™ Steering Puts You in Control", Advertisement—2 sample pages, available as early as 2005.
Larry Kaduce, "What's New for Ski Doo in 2002", published online at http://www.maximumsled.com, available as early as 2002, p. 2, line 4.
Sportech, "Sportech Articulating Bar Riser", at http://www.amazon.com/gp/product/B0007D6O0A/102-1605164-3428107?v=glance &n=3375251, available as early as 2004.
Powermadd Extreme Motor Sports, "Frequently asked Questions", available as early as 2004.
Online Catalog:Accessories:Handlebar Accessories:Handlebar Riser Kits, source unknown, available as early as 2004.
Ski-Doo Catalogue, "4-Position Adjustable Handlebar Riser", available at least as early as Jan. 24, 2004, p. 89.

* cited by examiner

*Primary Examiner*—Toan C To
(74) *Attorney, Agent, or Firm*—Davis & Bujold, P.L.L.C.

(57) ABSTRACT

An apparatus which has an extension arm adapted to mount a handlebar to a steering post of a vehicle. The extension arm having a first end and a second end. A coupling body is provided for pivotally mounting the first end to the steering post. A coupling body is also provided for pivotally mounting the second end to the handlebar. A linkage with a locking pin is provided for locking the handlebar in a selected orientation relative to the mounting arm.

19 Claims, 8 Drawing Sheets

ARTICULATED HANDLEBAR RISER BLOCK FOR RECREATIONAL VEHICLES

This application claims priority from Canadian Application Serial No. 2,494,292 filed Jan. 24, 2005.

FIELD OF THE INVENTION

The present invention relates to an articulated riser block for recreational vehicles.

BACKGROUND OF THE INVENTION

Drivers of snowmobiles may change position when driving a snowmobile. During the course of a single outing, a driver may move from a sitting position to a standing position, or vice versa. In order to facilitate driving during the standing position, extensions or riser blocks can be mounted between the steering post and the handlebars thereby extending the height of the steering post. The extended height allows for a more comfortable position when the driver is standing. However, the riser blocks are permanently installed at a selected orientation, and therefore the driver may be in an awkward driving position once they return to the sitting position.

SUMMARY OF THE INVENTION

What is required is an repositionable articulated riser block for snowmobiles.

According to the present invention there is provided An apparatus which has an extension arm adapted to mount a handlebar to a steering post of a vehicle. The extension arm having a first end and a second end. A coupling body is provided for pivotally mounting the first end to the steering post. A coupling body is also provided for pivotally mounting the second end to the handlebar. A linkage with a locking pin is provided for locking the handlebar in a selected orientation relative to the mounting arm.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION OF THE PREFERRED EMBODIMENT

The preferred embodiment, the apparatus generally identified by reference numeral 10, will now be described with reference to FIGS. 1 through 9

Structure and Relationship of Parts

Figure 1:
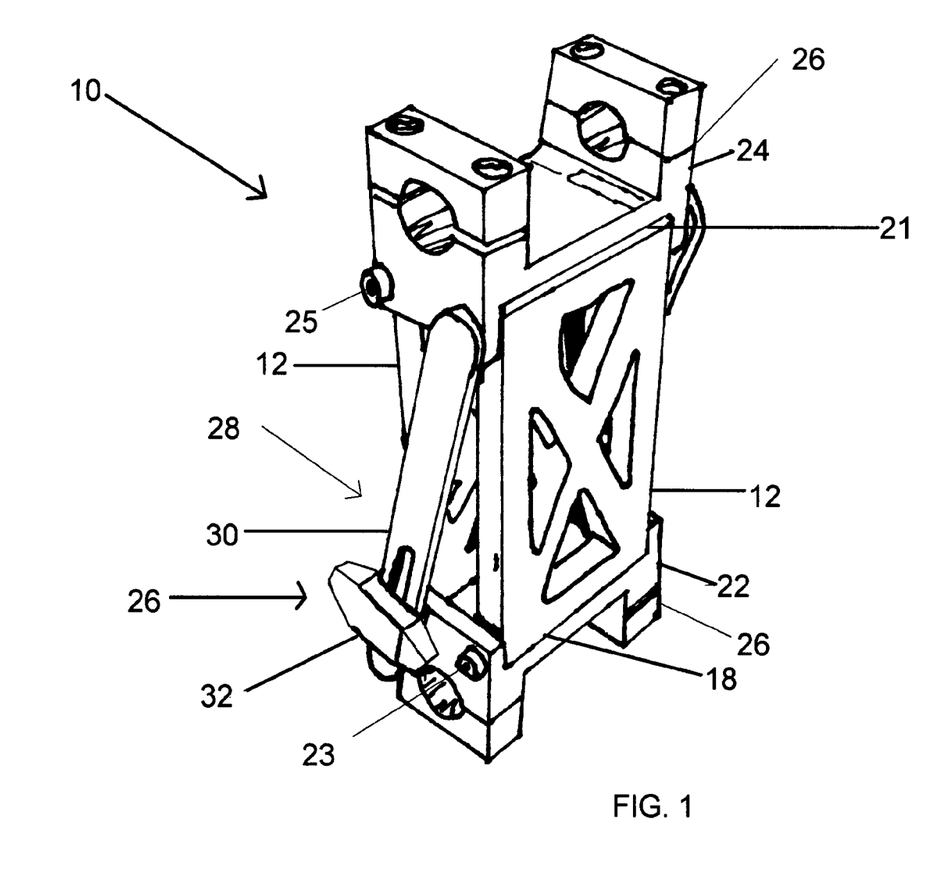
FIG. 1 is a perspective view of the apparatus.
Figure 2:
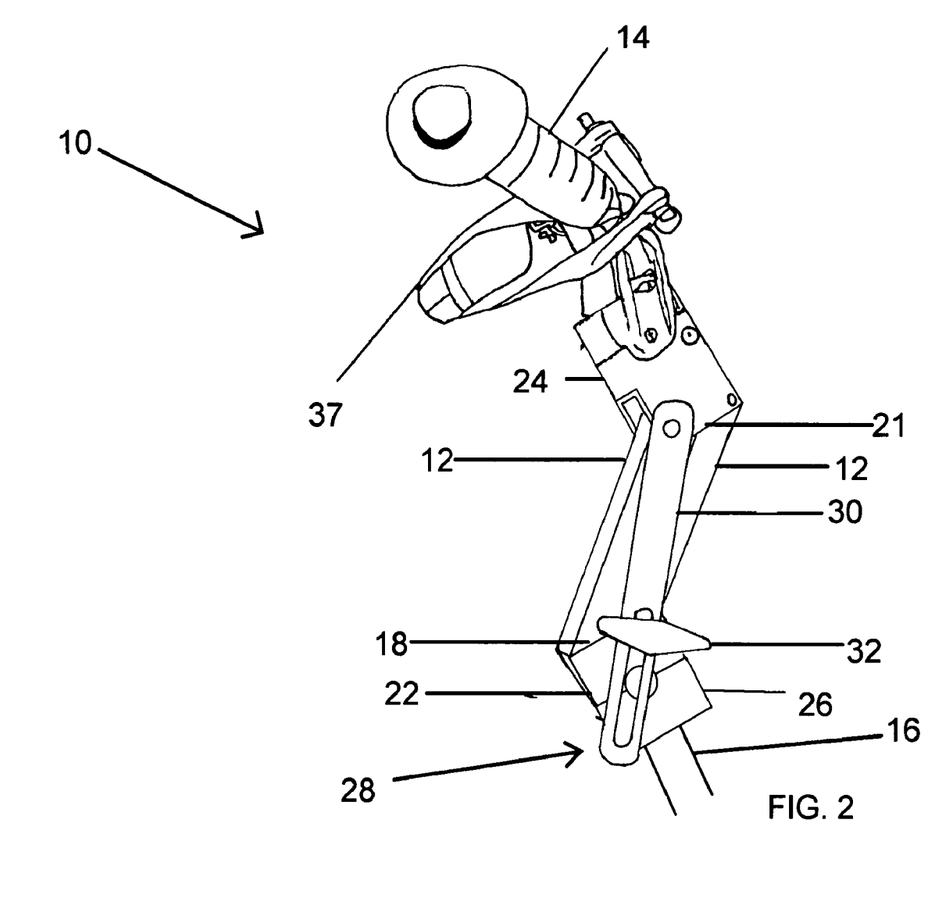
FIG. 2 is a side elevation view of the apparatus mounted on a steering post in a first position.
Figure 3:
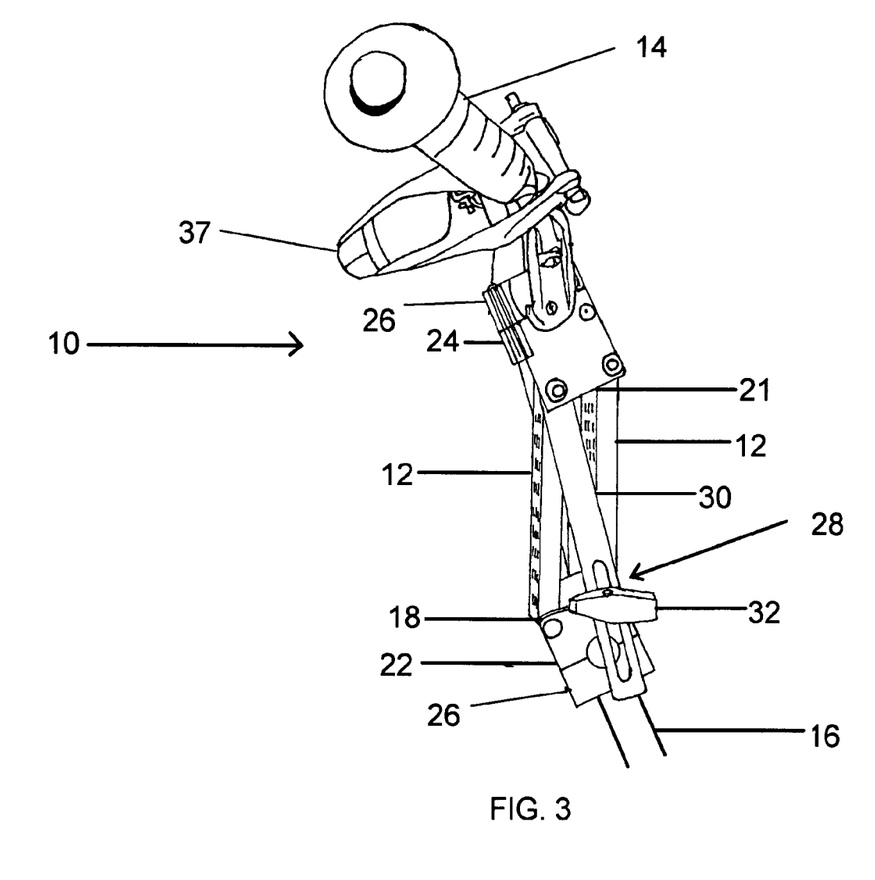
FIG. 3 is a side elevation view of the apparatus mounted on a steering post in a second position.
Figure 4:
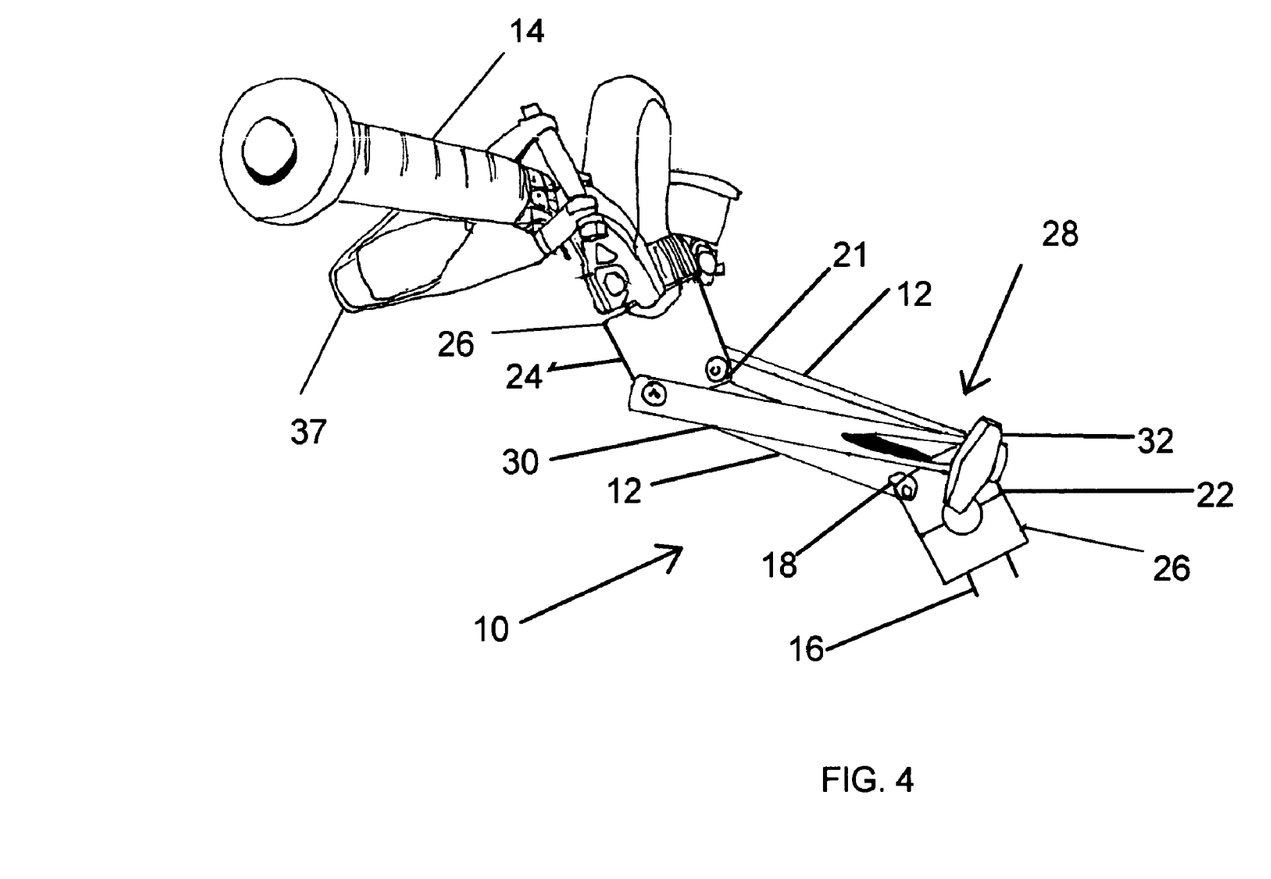
FIG. 4 is a side elevation view of the apparatus mounted on a steering post in a third position.

Referring to FIG. 1 there is provided an apparatus 10. Referring to FIG. 2, apparatus 10 has extension arms 12 adapted to mount a handlebar 14 to a steering post 16 of a snowmobile 20. Extension arms 12 have a first end 18 and a second end 21. A first coupling body 22 is provided for pivotally mounting first end 18 to steering post 16 such that extension arms 12 pivot horizontally on a first pivot axis 23 relative to steering post 16. A second coupling body 24 is provided for pivotally mounting second end 21 of extension arms 12 to handlebar 14 such that handlebar 14 pivots horizontally on a second pivot axis 25 relative to extension arms 12. Although the illustrated embodiment shows first coupling body 22 and coupling body 24 as being part of clamping assemblies 26, it will be appreciated that other means could be used for mounting handlebar 14 to apparatus 10 and for mounting apparatus 10 to steering post 16.

A linkage generally referenced by numeral 28 is provided between first coupling body 22 and second coupling body 24 such that as extension arms 12 pivot in relation to steering post 16, handlebar 14 remains in the appropriate driving orientation. Linkage 28 is a parallelogram linkage between first coupling body 22 and second coupling body 24. In the illustrated embodiment, linkage 28 includes a slotted sliding bar 30 with a locking pin 32 to lock linkage 28 in a selected position.

It will be appreciated that apparatus 10 is illustrated as having two extension arms 12, there could be only one or there could be more than two arms.

Operation

Figure 7:
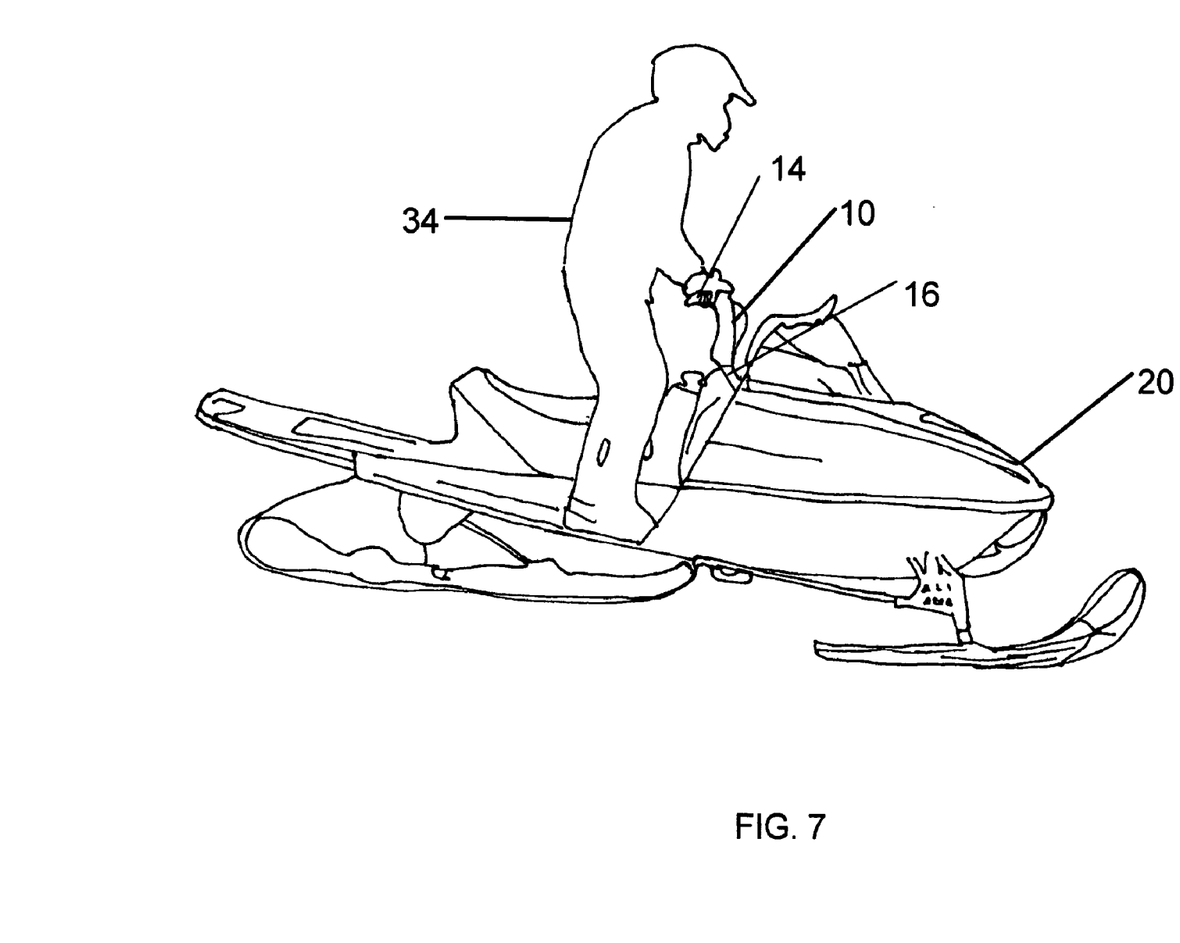
FIG. 7 is a side elevation view of a snowmobile with a driver in a standing position.
Figure 8:
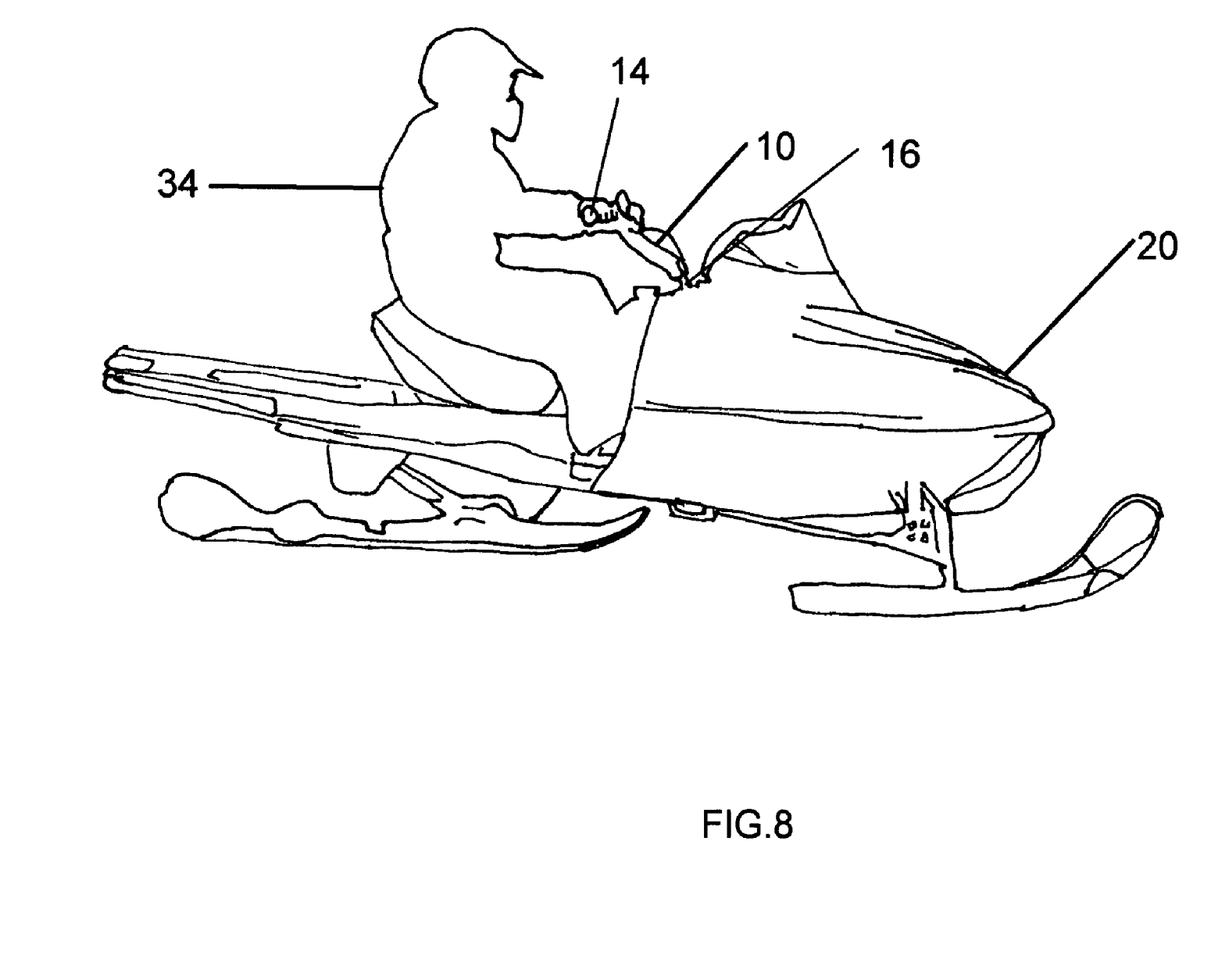
FIG. 8 is a side elevation view of a snowmobile with a driver in a sitting position.

Referring to FIGS. 7 and 8, a driver 34 of snowmobile 20 may change his driving stance from a sitting position illustrated in FIG. 8 to a standing position as illustrated in FIG. 7. When driver 34 decides to change his driving stance from the sitting position illustrated in FIG. 8 to the standing position illustrated in FIG. 7, he can stop snowmobile 20 and then unlock locking pin 32 illustrated in FIG. 1.

Referring to FIG. 8, by unlocking pin 32, arms 12 of apparatus 10 are permitted to freely pivot horizontally to the most comfortable position desired by driver 34. Due to linkage 28, handlebar 14 will remain the same appropriate orientation for driver 34. Driver 34 then locks locking pin 32 so as to lock apparatus 10 in the selected position, and can then resume driving in the standing position. If at any time, driver 34 decides to resume driving in the sitting position illustrated in FIG. 8, he can repeat the process to return arms 12 and handlebar 14 to the desired position for driving while sitting. Without linkage 28 maintaining the parallelogram style arrangement between first coupling body 22 and second coupling body 24, additional adjustments to the orientation of handlebar 14 would be necessary. As can be seen from FIGS. 2 through 4, as apparatus is repositioned for various driving stances, the orientation of handlebar 14 always remains constant in relation to steering post 16 and hence driver 34. This ensures that driver 34 can still comfortably grasp handlebar 14 and reach throttle 37 and other gears which are mounted on handlebar 14 regardless of whether he is in the standing or sitting position while driving.

It will be appreciated that while the illustrated embodiment is shown in use on a snowmobile, the apparatus could be used on any vehicle with a steering post.

Variations

Figure 5:
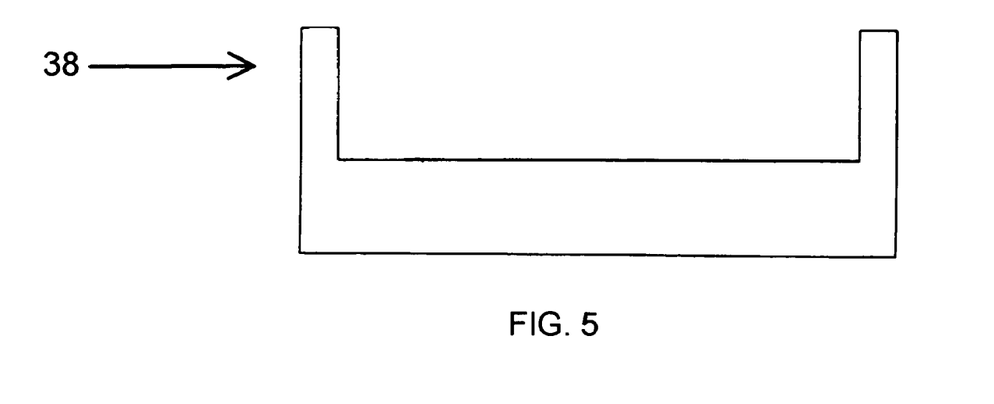
FIG. 5 is a mounting plate.
Figure 6:
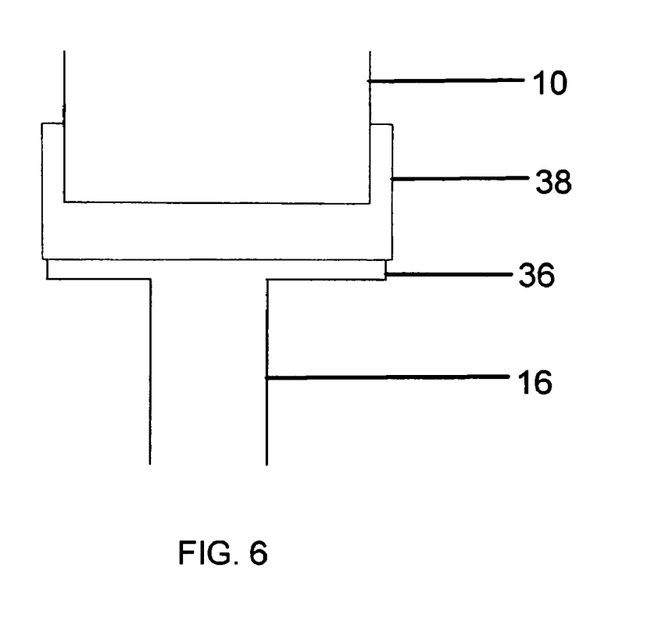
FIG. 6 is a side elevation view, in section, of the apparatus and mounting plate mounted on a steering post.

Referring to FIG. 5, there is illustrated an adapter plate 38. Referring to FIGS. 5 and 6, in some snowmobiles 20, steering post 16 terminates in a plate 36.

Figure 9:
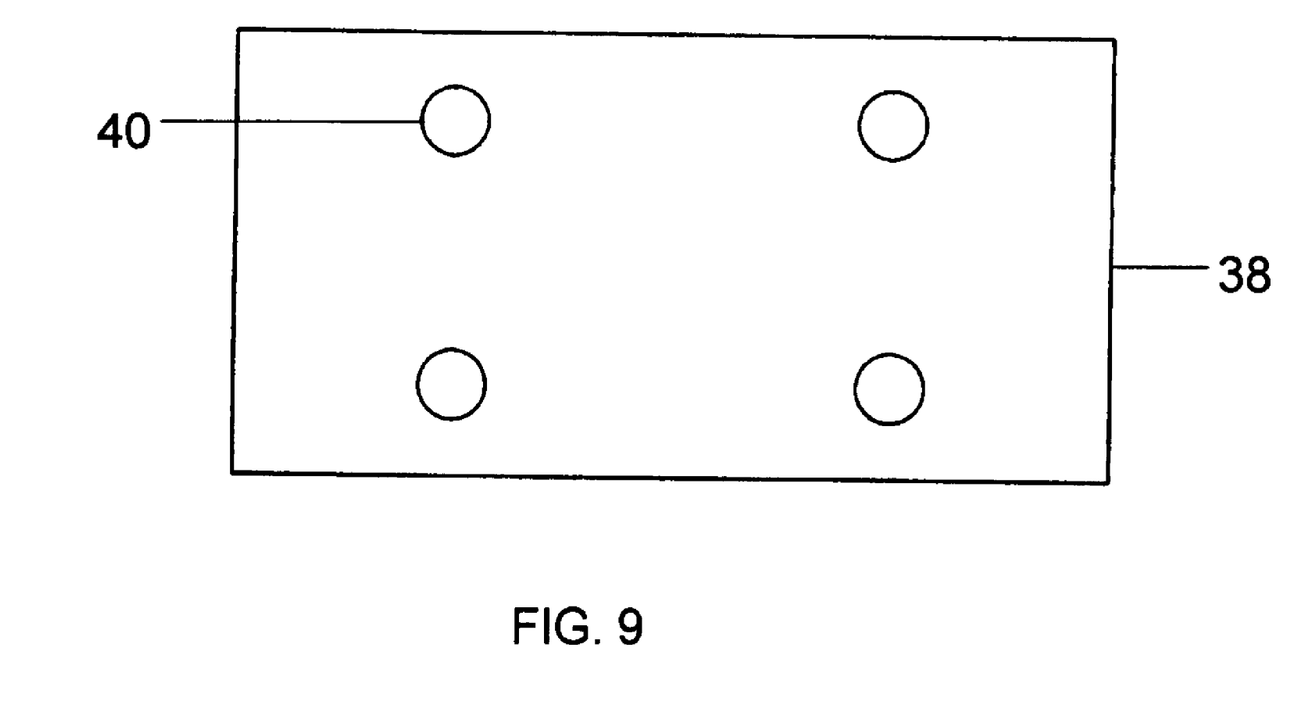
FIG. 9 is a top plan view of the mounting plate illustrated in FIG. 5.

Referring to FIG. 6, an adapter plate 38 is used to facilitate mounting apparatus 10 to steering post 16 which terminates in a plate 36. Referring to FIG. 9, in the illustrated embodiment, adapter plate 38 has a series of apertures 40 which allow for adapter plate 38 to be secured to varying bolt patterns on plates 36 on various brands of snowmobiles.

Cautionary Warnings

Snowmobile 20 should always be stopped before adjusting 10. Operation of snowmobile 20 while adjusting apparatus 10, may cause driver 34 to lose their balance or control of snowmobile 20.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the Claims.

The embodiments of the invention in which an exclusive property or privilege is claimed are defined as follows:

1. An apparatus comprising,
    at least one extension arm adapted to mount a handlebar to a steering post of a vehicle;
    the at least one extension arm having a first end and a second end;
    a coupling body adapted to engage the steering post, the body being pivotally connected to the extension arm for pivotal movement around a substantially horizontal pivot axis such that the extension arm pivots relative to the steering post, and the coupling body having an adapter plate which is adapted to mount to a mounting plate of the steering post;
    means for pivotally mounting the second end to the handlebar; and
    means for locking the handlebar in a selected orientation relative to the steering post.

2. The apparatus of claim 1 wherein the means for locking the handlebar in a selected orientation relative to the steering post is a linkage connecting the means for pivotally mounting the first end to the steering post to the means for pivotally mounting the second end to the handlebar such that the handlebar maintains its orientation relative to the steering post as the extension arm is pivoted;
    and means for locking the linkage in a selected position.

3. The apparatus of claim 2, wherein the linkage is a parallelogram linkage.

4. The apparatus of claim 2, wherein the means for locking the linkage in a selected position is a locking pin.

5. The apparatus of claim 1, wherein the means for pivotally mounting the second end to the handlebar is a coupling body adapted to engage the handlebar, the body being pivotally connected to the extension arm for pivotal movement around a substantially horizontal pivot axis such that the handlebar pivots horizontally relative to the extension arm.

6. The apparatus of claim 5, wherein the coupling body being a first part of a two part clamping assembly.

7. The apparatus of claim 1, wherein the coupling body being a first part of a two part clamping assembly.

8. In combination,
    a snowmobile having a steering post;
    at least one extension arm adapted to mount a handlebar to the steering post of the snowmobile;
    the at least one extension arm having a first end and a second end;
    a coupling body adapted to engage the steering post, the body being pivotally connected to the extension arm for pivotal movement around a substantially horizontal pivot axis such that the extension arm pivots relative to the steering post, and the coupling body having an adapter plate which is adapted to mount to the mounting plate of the steering post;
    means for pivotally mounting the second end to the handlebar; and
    means for locking the handlebar in a selected orientation relative to the steering post.

9. The combination of claim 8 wherein the means for locking the handlebar in a selected orientation relative to the steering post is a linkage connecting the means for pivotally mounting the first end to the steering post to the means for pivotally mounting the second end to the handlebar such that the handlebar maintains its orientation relative to the steering post as the extension arm is pivoted;
    and means for locking the linkage in a selected position.

10. The combination of claim 8 wherein the means for locking the linkage in a selected position is a locking pin.

11. The combination of claim 8, wherein the means for pivotally mounting the first end to the steering post is a coupling body adapted to engage the steering post, the body being pivotally connected to the extension arm for pivotal movement around a substantially horizontal pivot axis such that the extension arm pivots relative to the steering post.

12. The combination of claim 8, wherein the coupling body is a first part of a two part clamping assembly.

13. An apparatus comprising:
    a first extension arm and a second extension arm adapted to mount a handlebar to a steering post of a vehicle, each of the first and the second extension arms having a first end and a second end, the first and the second extension arms being parallel;
    means for pivotally mounting the first end of each of the first and the second extension arms to the steering post, the pivot axis of the first end of the first extension arm being parallel to and spaced from the pivot axis of the first end of the second extension arm;
    means for pivotally mounting the second end of each of the first and the second extension arms to the handlebar, the pivot axis of the second end of the first extension arm being parallel to and spaced from the pivot axis of the second end of the second extension arm; and
    a linkage having a pivoting end and a slotted end, the pivoting end being pivotally attached to the first extension arm and the slotted end being adjustably attached to the second extension arm by a locking pin on the second extension arm that extends through the slotted end, such that:
    when disengaged, the slotted end is permitted to slide unfettered relative to the locking pin, such that the orientation of the first and the second extension arms is adjustable between a forward position, a rearward position relative to the steering post, and intermediate positions between the forward position and the rearward position; and when engaged, the locking pin exerts a clamping force upon the linkages to lock the first and the second extension arms in the desired position relative to the steering post.

14. The apparatus of claim 13 wherein the linkage connects the means for pivotally mounting the first end of one of the first and the second extension arms to the steering post to the means for pivotally mounting the second end of the other of the first and the second extension arms to the handlebar.

15. The apparatus of claim 13 wherein the means for pivotally mounting the first end to the steering post is a coupling body adapted to engage the steeling post, and the body being pivotally connected to the extension arm for pivotal movement around a substantially horizontal pivot axis such that the extension arm pivots relative to the steering post.

16. The apparatus of claim 15 wherein the coupling body is a first part of a two part clamping assembly.

17. The apparatus of claim 15 wherein the coupling body has an adapter plate which is adapted to mount to a mounting plate of the steering post.

18. The apparatus of claim 13 wherein the means for pivotally mounting the second end to the handlebar is a coupling body adapted to engage the handlebar, and the body being pivotally connected to the extension arm for pivotal movement around a substantially horizontal pivot axis such that the handlebar pivots horizontally relative to the extension arm.

19. The apparatus of claim 18 wherein the coupling body is a first part of a two part damping assembly.

* * * * *